(12) United States Patent
Isobe et al.

(10) Patent No.: US 6,833,088 B1
(45) Date of Patent: Dec. 21, 2004

(54) ORGANIC SOLVENT BASED DISPERSION OF CONDUCTIVE POWDER AND CONDUCTIVE COATING MATERIAL

(75) Inventors: Kaoru Isobe, Yokkaichi (JP); Masanori Tomonari, Yokkaichi (JP); Tsutomu Kikuchi, Yokkaichi (JP)

(73) Assignee: Ishihara Sangyo Kaisha, Ltd., Osaka (JP)

( * ) Notice: Subject to any disclaimer, the term of this patent is extended or adjusted under 35 U.S.C. 154(b) by 296 days.

(21) Appl. No.: 10/069,782

(22) PCT Filed: Sep. 4, 2000

(86) PCT No.: PCT/JP00/05993

§ 371 (c)(1),
(2), (4) Date: Feb. 28, 2002

(87) PCT Pub. No.: WO01/18137

PCT Pub. Date: Mar. 15, 2001

(30) Foreign Application Priority Data

Sep. 6, 1999 (JP) .......................... 11/251356

(51) Int. Cl.⁷ ................................. H01B 1/20
(52) U.S. Cl. .................................... 252/520.1
(58) Field of Search ...................... 252/520.1

(56) References Cited

U.S. PATENT DOCUMENTS

| | | | |
|---|---|---|---|
| 4,937,148 A | * | 6/1990 | Sato et al. ................. 423/618 |
| 5,834,549 A | | 11/1998 | Suezaki et al. |
| 5,885,706 A | * | 3/1999 | Bergmann et al. .......... 428/323 |

FOREIGN PATENT DOCUMENTS

| | | | |
|---|---|---|---|
| JP | 1-261469 A | | 10/1989 |
| JP | 1-261469 | * | 10/1989 |
| JP | 4-62713 | | 2/1992 |
| JP | 8-20734 | | 1/1996 |
| JP | 8-27405 | | 1/1996 |
| JP | 10-326521 A | | 12/1998 |
| JP | 11-172161 | | 6/1999 |

* cited by examiner

Primary Examiner—Mark Kopec
(74) Attorney, Agent, or Firm—Paul E. White, Jr.; Manelli Denison & Selter PLLC

(57) ABSTRACT

The organic solvent-based dispersion of conductive powders of the present invention comprises an organic solvent-based medium as a dispersion medium, conductive tin oxide powders coated with an organic metal coupling agent at the surface of tin oxide particles and a dispersant, and shows excellent dispersibility and high transparency. Therefore, the dispersion is useful for antistatic purpose of transparent substrates including the display surface of display devices, their surface protecting materials, films, etc.

11 Claims, No Drawings

ORGANIC SOLVENT BASED DISPERSION OF CONDUCTIVE POWDER AND CONDUCTIVE COATING MATERIAL

TECHNICAL FIELD

The present invention relates to an organic solvent-based dispersion of conductive tin oxide powders having excellent dispersibility and excellent transparency, and an organic solvent-based conductive paint using the same.

The conductive paint of the present invention is useful for static prevention of the display surface of a display device, its surface protecting material, a transparent substrate such as a film, etc., and is also useful as infrared shielding for building materials, window materials of vehicles, etc.

BACKGROUND ART

A variety of transparent substrates including display surfaces for display devices such as cathode ray tubes (CRT), liquid crystal displays (LCD), etc., window mate rials for clean rooms, glass or plastics used as packaging materials for IC packages, or films used for OHP or photographs, etc. are generally insulating and thus tend to be electrically charged. For this reason, dusts or trashes are apt to attach to the surfaces of these materials. In electronic devices, static electricity causes problems of incorrect working, or the like.

Attempts to solve these problems have been made typically by kneading conductive powders into transparent substrate materials and then molding the kneaded powders, or by coating conductive powder-incorporated paints onto the surface of such substrates. Tin oxide powders are suitable as conductive powders for these applications, since they can retain excellent transparency, if uniformly dispersed in a medium, and have excellent conductive properties. For use in organic solvent-based paint, however, tin oxide powders are only sparingly dispersible in paint due to its extremely strong hydro-philicity, resulting in failure to obtain sufficient transparency.

In order to improve the dispersibility of tin oxide powders in organic solvent-based paint, there is known a method in which a dispersant such as a surfactant or the like is incorporated into paint. According to the method, it is required to incorporate large quantities of a dispersant into paint for achieving sufficient transparency, which, when coated, leads to poor adhesion to a substrate material and reduction in coating strength. Furthermore, these conductive tin oxide particles are after all coated with such a nonconductive dispersant at the surface thereof to decrease the conductivity.

DISCLOSURE OF INVENTION

The present invention has overcome the foregoing problems by providing an organic solvent-based dispersion of conductive tin oxide powders, which have excellent dispersibility even when the amount of the dispersant is minimized as possible, and when used in organic solvent-based paint, exhibit excellent transparency, conductivity and adhesion, and by providing conductive organic solvent-based paint obtainable by formulating the dispersion above.

As a result of extensive studies, the present inventors have discovered that, when conductive tin oxide powders coated with an organic metal coupling agent are dispersed in an organic solvent-based medium in the presence of a dispersant, the resulting dispersion provides a good dispersibility even in a greatly reduced amount of the dispersant to be added, and a mixture of the dispersion and resin provides excellent transparency and conductivity with excellent physical properties for coating. The present invention has thus been attained.

That is, the present invention relates to a organic solvent-based dispersion of conductive powders comprising an organic solvent-based medium as a dispersion medium, tin oxide powders coated with an organic metal coupling agent at the surface of the tin oxide particles and a dispersant. The present invention further relates to conductive paint comprising a mixture of the dispersion and resin.

BEST MODE FOR CARRYING OUT THE INVENTION

The conductive tin oxide powders used in the present invention have a specific surface area in a range of preferably 20 to 150 $m^2/g$, more preferably 30 to 130 $m^2/g$, and most preferably 40 to 100 $m^2/g$. With the specific surface area much smaller than the range above, transparency and smoothness decrease when formed into a film; when the specific surface area overly exceeds the range described above, the amounts required for the dispersant and organic metal coupling agent increase, which will lead to reduction in film strength, adhesion and conductivity. The conductive tin oxide powders may take any shape without any particular restriction and is selected from spheres, needles, dendrites, plates and the like. For the purpose of improving dispersibility, oxides of silicon, tungsten, zirconium, aluminum, etc. may additionally be incorporated into the tin oxide particles to form a solid solution, or carried or coated on the surface of the tin oxide particles. Carrying or coating of these metal oxides may be effected prior to coating with the organic metal coupling agent later described, simultaneously in the co-presence of the organic metal coupling agent during manufacturing steps, or after the coating unless the purpose of the present invention is damaged. There is no particular restriction to techniques for the carrying or coating of the metal oxides.

Preferably, the conductive tin oxide powder's used in the present invention contain, in the tin oxide powders, a different type element(s) such as antimony, phosphor, fluorine, tungsten, tantalum, niobium, etc., with particular preference being antimony. The amount of antimony contained is preferably 0.5 to 20 wt %, more preferably 8 to 15 wt %, when calculated as $Sb_2O_3$, based on the tin oxide powders. When the amount of antimony is much smaller than the range described above, the intended effect is not obtained, and with the amount overly exceeding the range above, the powders are undesirably colored.

The conductive tin oxide powders used in the present invention may be prepared by, e.g., (1) a method which involves neutralizing a solution of a tin compound, fractionating the resulting precipitates of hydrated tin oxide and firing the hydrated tin oxide; and (2) a method which involves hydrolyzing an alcoholic solution of tin chloride in water, fractionating and firing the product; either method can be used. Where the different type element such as antimony is incorporated into the tin oxide powders according to, e.g., the method (1) above, a solution of the different type element may be added to the system during the neutralization for forming co-precipitates.

It is required for the conductive tin oxide powders used in the present invention that the surface of the particles should be coated with the organic metal coupling agent. Merely by adding the organic metal coupling agent to the dispersion, the intended effect of improving dispersibility and sufficient transparency cannot be obtained, even when using in combination with the dispersant later described.

Examples of the organic metal coupling agent are silane coupling agents such as hexyltrimethoxy-silane, octyltrimethoxysilane, methacryloxypropyl-trimethoxysilane, etc.; titanate coupling agents such as isopropyl tris(dioctyl pyrophosphate) titanate, tetra(2,2-diallyloxymethyl-1-butyl)bis(ditridecyl)-phosphite titanate, isopropyl triisostearoyl titanate, etc.; aluminum coupling agents such as acetalkoxy aluminum diisopropylate, etc. The organic metal coupling agent may be employed alone or in combination of at least two different coupling agents.

The amount of the organic metal coupling agent coated is preferably 0.01 to 30 wt %, and more preferably 0.05 to 15 wt %, based on the conductive tin oxide powders. With the coating amount much smaller than the range above, the dispersibility of the conductive tin oxide powders in the organic solvent-based medium decreases; with the amount overly exceeding the range above, the resulting coated film encounters problems of reduced strength of the coated film, adhesion and conductivity.

The organic metal coupling agent can be coated onto the conductive tin oxide powders by, e.g., (1) a dry method which comprises adding the coupling agent or an aqueous or alcoholic solution of the coupling agent to the tin oxide powders charged in a high speed stirrer such as a Henschel mixer while agitation, uniformly stirring and then drying the mixture; (2) a wet method which comprises adding the coupling agent or an aqueous or alcoholic solution of the coupling agent to a slurry of tin oxide powders dispersed in water while agitation, thoroughly stirring, filtering, washing and then drying the mixture; any of these methods can be employed.

The dispersion of the present invention contains preferably 10 to 70 wt %, more preferably 15 to 50 wt %, of the tin oxide powders coated with the organic metal coupling agent. With the content much smaller than the range above, a problem that conductivity does not increase sufficiently occurs, when the dispersion mixing with a resin is used as conductive paint. When the organic metal coupling agent contained is too much, it becomes difficult to obtain a good dispersion from an industrial viewpoint. It is preferred that the entire surface of the tin oxide particles be coated with the organic metal coupling agent, but uncoated particles or partly coated particles may also be contained within such a range that does not damage the purpose of the invention.

In order to improve the dispersibility and stability of the conductive tin oxide powders formulated in the dispersion of the present invention, it is necessary to use dispersants. It is difficult to disperse the tin oxide powders sufficiently in the organic solvent-based medium merely by coating tin oxide with the organic metal coupling agent. Even if the amount of the coupling agent is greatly increased for the treatment, such does not eliminate the difficulty.

As the dispersants, there is usable any one of cationic dispersants such as a quaternary ammonium salts, etc.; anionic dispersants such as carboxylic acid salts, sulfonic acid salts, sulfuric acid esters, phosphoric acid esters, etc.; and nonionic dispersants of ether type, ether ester type, ester type, nitrogen-containing type, etc. There is no particular restriction so long as the dispersant is adsorbed to the conductive tin oxide powders. Among these dispersants, cationic type dispersants are preferable. Since the surfaces of the conductive tin oxide powders are usually negatively charged in a solution, the dispersant of cationic type is electrostatically adsorbed to the powders to improve the effects. The amount of the dispersant in the dispersion ranges preferably from 0.01 to 20 wt %, more preferably from 0.1 to 15 wt %, and most preferably from 0.1 to 10 wt %. With the amount of the dispersant much smaller than the range above, the tin oxide powders tend to agglomerate in the dispersion or in the conductive paint. When the amount of the dispersant is much larger than the range above, sufficient strength of the film cannot be obtained when coated, and adhesion to a substrate is worsened. Moreover, the surface of the tin oxide powders has eventually been coated with the dispersant, which is an insulating material, so that the conductivity decreases when the dispersant is present too much.

In the present invention, the dispersant can be used alone or in combination of at least two different dispersants. When two or more dispersants are employed in combination, it is preferred to use the dispersants having different solubilities in the organic solvent-based medium as a dispersion medium. By doing so, the dispersibility of the conductive powders can be maintained more stably in preparing conductive paint.

In the dispersion of the present invention, the organic solvent-based medium as a dispersion medium has no particular restriction but may be any conventional organic solvent generally available for paint, which examples include toluene, butyl acetate, propyl alcohol, butyl alcohol, methyl ethyl ketone, xylene, etc.

The organic solvent-based dispersion of the conductive powders according to the present invention can be prepared, e.g., by pre-mixing the conductive tin oxide powders coated with the coupling agent described above, the dispersant and the organic solvent-based medium, and dispersing the mixture through wet-grinding using a conventional grinder such as a sand mill, a ball mill, etc. The solid content in the wet grinding is preferably 10 to 80 wt %, and more preferably 30 to 60 wt %. With the solid content much higher than the range above, fluidizability decreases to make the wet grinding difficult; and with the amount overly lower than the range above, the content of the tin oxide powders in the dispersion becomes small, which is not economical. The final solid content in the dispersion can be appropriately adjusted by controlling the amount of the organic solvent-based medium, depending upon use.

The present invention further relates to conductive paint comprising the organic solvent-based dispersion described above and a resin. Any resin can be used for the conductive paint of the present invention and there is no particular limitation so long as the resin is soluble in the organic solvent-based medium described above. For use in the invention, the resin may be appropriately selected from, e.g., acrylic resin, alkyd resin, melamine resin, polyester resin, vinyl chloride-vinyl acetate resin, epoxy resin, urethane resin, phenol resin, amino resin, fluorine resin, polyvinyl alcohol resin, ethylene-vinyl acetate copolymer, acryl-styrene copolymer, etc. The amount of the resin in the paint is preferably 5 to 90 wt %, more preferably 5 to 50 wt %.

In addition to the dispersion and resin described above, the conductive paint of the present invention may further contain additives conventionally used for paint, such as a stabilizer, a curing agent, a polymerization initiator, and the like. These additives may be used in appropriate combination depending upon purposes.

The conductive paint of the present invention can be prepared, e.g., by blending the dispersion and the resin, or by blending a solution of the resin previously prepared by dissolving the resin in a solvent and the dispersion. The conductive paint can be readily prepared by blending the dispersion and the resin or the resin solution while agitating with a blade type stirrer, a disperser, a homomixer, a dissolver, an impeller mill, etc.

The thus prepared conductive paint of the present invention is coated on a substrate such as an acrylic board, a polyvinyl board, a film, a glass plate, etc. to form a paint film having both antistatic and transparent properties. For bar coating or spray coating, a coater can be used, or ordinary coating technique such as spin coating or dip coating is available.

EXAMPLES

Hereinafter the present invention will be described below in more detail with reference to the following EXAMPLES, but is not deemed to be limited to these EXAMPLES.

Example 1

In a juice mixer was charged 100 g of spherical antimony-containing conductive tin oxide powders (SN-100P: made by Ishihara Sangyo K. K.) having a specific surface area of 70 m$^2$/g. While agitating, 12.5 g of ¼ (in a weight ratio) solution of silane coupling agent AZ-6171 (made by Nippon Unika) in ethanol was added to the powders followed by stirring. Then, the mixture was dried at 150° C. for 40 minutes to coat the surface of the particles with the silane coupling agent. The amount of the silane coupling agent used for the coating was 2.5 wt % based on the antimony-containing tin oxide powders.

In a glass bottle, 40 g of the thus coated tin oxide powders, 3.2 g of cationic type dispersant CB-50 (made by Toho Chemical Co., Ltd.), 70 g of toluene and 160 g of zirconium beads were charged and ground for 90 minutes using a paint conditioner (Model #5110, made by Red Devil Co.) to give the organic solvent-based dispersion (Sample A) of the present invention. The solid content of Sample A was 38.2 wt %.

Example 2

The organic solvent-based dispersion (Sample B) of the invention was obtained in a manner similar to EXAMPLE 1, except that butyl acetate was used in lieu of toluene of EXAMPLE 1. The solid content of Sample B was 37.5 wt %.

Example 3

The organic solvent-based dispersion (Sample C) of the invention was obtained in a manner similar to EXAMPLE 1, except that titanium coupling agent (KR-TTS, made by Ajinomoto) was used in lieu of the silane coupling agent of EXAMPLE 1. The solid content of Sample C was 37.2 wt %.

Example 4

The organic solvent-based dispersion (Sample D) of the invention was obtained in a manner similar to EXAMPLE 1, except that nonionic dispersant BYK-163 (made by BYK) was used in lieu of the cationic dispersant CB-50 of EXAMPLE 1. The solid content of Sample D was 37.2 wt %.

Example 5

The organic solvent-based dispersion (Sample E) of the invention was obtained in a manner similar to EXAMPLE 1, except that needle-like antimony-containing conductive tin oxide powders (FS-10P: made by Ishihara Sangyo K. K.) having a specific surface area of 30 m$^2$/g was used in lieu of the spherical antimony-containing conductive tin oxide powders of EXAMPLE 1. The solid content of Sample E was 38.0 wt %.

Example 6

The organic solvent-based dispersion (Sample F) of the invention was obtained in a manner similar to EXAMPLE 5, except that 1.6 g of cationic dispersant CB-50 and 1.6 g of cationic dispersant OB-80E (made by Toho Chemical Co., Ltd.) were used in combination in EXAMPLE 5. The solid content of Sample F was 38.1 wt %.

Example 7

The organic solvent-based dispersion (Sample G) of the invention was obtained in a manner similar to EXAMPLE 1, except that methyl ethyl ketone was used in place of toluene of EXAMPLE 1. The solid content of Sample G was 37.8 wt %.

Example 8

The organic solvent-based dispersion (Sample H) of the invention was obtained in a manner similar to EXAMPLE 1, except that isopropyl alcohol was used in place of toluene of EXAMPLE 1. The solid content of Sample H was 37.3 wt %.

Example 9

The organic solvent-based dispersion (Sample, I) of the invention was obtained in a manner similar to EXAMPLE 5, except that methyl ethyl ketone was used in place of toluene of EXAMPLE 5. The solid content of Sample I was 38.0 wt %.

Comparative Example 1

The procedures were carried out as in EXAMPLE 1 except that the powders were not coated with the silane coupling agent. A paste-like substance was obtained but no dispersion was obtained. Thus, no further evaluation was made.

Comparative Example 2

The organic solvent-based dispersion (Sample J) was obtained in a manner similar to EXAMPLE 1, except that the powders were not coated with the silane coupling agent and the amount of dispersant CB-50 was increased to 8.0 g in EXAMPLE 1. The solid content of Sample J was 37.2 wt %.

Comparative Example 3

The organic solvent-based dispersion (Sample K) was obtained in a manner similar to EXAMPLE 1, except that the powders were not coated with the silane coupling agent and 1.0 g of silane coupling agent AZ-6171 was added during grinding with a paint conditioner. The solid content of Sample K was 37.2 wt %.

Comparative Example 4

The procedures were performed as in EXAMPLE 1 except that the coating amount of the silane coupling agent was increased to 10.0 wt % and no dispersant was used. A paste-like substance was obtained but no dispersion was formed. Thus, no further evaluation was made.

Test Example

The tin oxide particles in the organic solvent-based dispersions (Samples A through K) obtained in EXAMPLES 1 through 6 and COMPARATIVE EXAMPLES 2 and 3 were measured in terms of median size, using a size distribution measuring instrument, CAPA-700 (made by Shimadzu Seisakusho), which was used as an index of the dispersibility of the dispersions.

The solid contents of Samples A through K were diluted to 30 wt % with respective solvents. After 17 g of the diluted sample was mixed with 2.5 g of UV curing acrylic resin (DPHA: made by Nippon Kayaku K. K.), a polymerization initiator (DETX-S: made by Nippon Kayaku K. K.), a polymerization accelerator (EPA: made by Nippon Kayaku K. K.) and 7.7 g of a solvent (solvent used for each dispersion), the mixture was agitated to give conductive paint.

The thus obtained conductive paint was coated onto a glass plate in a dry thickness of 2.3 μm using a bar coater, subjected to natural drying and then exposed to UV rays to obtain a paint film. The surface resistivity and haze percentage (an index showing the degree a cloudy appearance of a film; the lower the haze value, the higher the transparency) of the paint film were determined using a digital ohm meter (Model R-506, made by Kawaguchi Denki Seisakusho) and a haze meter (Model NDH-300A, made by Nippon Denshoku Kogyo K. K.), respectively. Furthermore, pencil hardness was evaluated according to JIS K5400.

The results are shown in TABLE 1.

TABLE 1

| | Dispersed state of dispersion | Median size of dispersion (μm) | Surface resistivity (Ω/□) | Haze percentage (%) | Pencil hardness |
|---|---|---|---|---|---|
| Ex. 1 | good | 0.10 | $3.3 \times 10^8$ | 0.64 | 4H |
| Ex. 2 | good | 0.09 | $2.6 \times 10^8$ | 0.91 | 4H |
| Ex. 3 | good | 0.09 | $4.3 \times 10^9$ | 0.52 | 4H |
| Ex. 4 | good | 0.09 | $7.8 \times 10^8$ | 0.80 | 4H |
| Ex. 5 | good | 0.12 | $4.5 \times 10^8$ | 0.95 | 4H |
| Ex. 6 | good | 0.09 | $2.3 \times 10^7$ | 1.00 | 4H |
| Ex. 7 | good | 0.10 | $8.0 \times 10^7$ | 0.61 | 4H |
| Ex. 8 | good | 0.09 | $7.5 \times 10^8$ | 0.77 | 4H |
| Ex. 9 | good | 0.13 | $5.8 \times 10^8$ | 1.07 | 4H |
| Comp. Ex. 1 | poor dispersion | — | — | — | — |
| Comp. Ex. 2 | good | 0.14 | $6.7 \times 10^{13}$ | 0.78 | 2B |
| Comp. Ex. 3 | good | 0.18 | $5.9 \times 10^9$ | 2.81 | 2H |
| Comp. Ex. 4 | poor dispersion | — | — | — | — |

INDUSTRIAL APPLICABILITY

The present invention provides the dispersion comprising conductive tin oxide powders, the surface of which has been coated with the organic metal coupling agent, the dispersant and the organic solvent-based medium. The dispersion shows excellent dispersibility even when the amounts of the coupling agent and the dispersant are minimized as possible. Thus, the conductive paint having excellent transparency, conductivity and adhesion can be readily obtained in a simple manner by blending the dispersion of the invention with the organic solvent-based resin or the resin solution. For this reason, the present invention can provide antistatic materials for CRT, clean room windows, films, etc. advantageously in an economical way.

What is claimed is:

1. An organic solvent-based dispersion of conductive powders comprising an organic solvent-based medium as a dispersion medium, tin oxide powders coated with an organic metal coupling agent at the surface of tin oxide particles, and a dispersant, wherein the dispersion does not contain resin substantially, and at least one oxide, selected from the group consisting of silicon, tungsten, zirconium and aluminum, incorporated into the tin oxide particles to form a solid solution, or carried or coated on the surface of the tin oxide particles.

2. The organic solvent-based dispersion according to claim 1, wherein the tin oxide powders contain antimony.

3. The organic solvent-based dispersion according to claim 1, wherein the tin oxide powders coated with the organic metal coupling agent are contained in 10 to 70 wt %.

4. The organic solvent-based dispersion according to claim 1, wherein the tin oxide powders have a specific surface area of 20 to 150 m²/g.

5. The organic solvent-based dispersion according to claim 1, wherein at least one of a silane coupling agent, a titanate coupling agent and an aluminum coupling agent is used as the organic metal coupling agent.

6. The organic solvent-based dispersion according to claim 1, wherein the coating amount of the organic metal coupling agent is 0.01 to 30 wt %, based on the tin oxide powders.

7. The organic solvent-based dispersion according to claim 1, wherein the dispersant is contained in 0.01 to 20 wt %.

8. The organic solvent-based dispersion according to claim 1, wherein at least two dispersants are employed.

9. The organic solvent-based dispersion according to claim 8, wherein the solubilities of the dispersants in the organic solvent-based medium as a dispersion medium are different from each other.

10. The organic solvent-based dispersion according to claim 1, wherein the dispersant is a cationic dispersant.

11. Conductive paint obtainable by blending the organic solvent-based medium according to claim 1, and resin.

* * * * *